(12) United States Patent
Wojtkowski, Jr. et al.

(10) Patent No.: US 8,500,332 B2
(45) Date of Patent: *Aug. 6, 2013

(54) SELF PUMPING OIL FILM BEARING

(75) Inventors: Thomas C. Wojtkowski, Jr., Shrewsbury, MA (US); Peter N. Osgood, Westborough, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 613 days.

This patent is subject to a terminal disclaimer.

(21) Appl. No.: 12/774,241

(22) Filed: May 5, 2010

(65) Prior Publication Data

US 2011/0274380 A1    Nov. 10, 2011

(51) Int. Cl.
*F16C 33/74* (2006.01)
*F16C 3/14* (2006.01)
*F16J 15/32* (2006.01)

(52) U.S. Cl.
USPC .......... 384/135; 384/322; 384/403; 384/412; 277/353; 277/551

(58) Field of Classification Search
USPC ............... 384/135, 322, 397, 398, 400, 403, 384/412, 414, 462, 471, 472; 277/353, 551, 277/562, 577; 184/6.26, 6.8, 7.1
See application file for complete search history.

(56) References Cited

U.S. PATENT DOCUMENTS

| | | | |
|---|---|---|---|
| 2,848,284 A | 8/1958 | Atkinson et al. | |
| 2,929,663 A | 3/1960 | Hoeltje | |
| 4,541,785 A | 9/1985 | Hoarler | |
| 4,741,630 A | 5/1988 | Oeynhausen et al. | |
| 5,489,190 A | 2/1996 | Sullivan | |
| 6,086,255 A * | 7/2000 | Lyon | 384/12 |
| 6,146,020 A | 11/2000 | Innis, Jr. | |
| 6,783,131 B2 * | 8/2004 | Martins et al. | 277/564 |
| 6,802,511 B1 | 10/2004 | Martins et al. | |
| 6,851,676 B2 * | 2/2005 | Martins et al. | 277/353 |
| 7,334,982 B2 | 2/2008 | Singh et al. | |
| 7,387,445 B2 | 6/2008 | Swainson | |
| 7,625,126 B2 | 12/2009 | Peters et al. | |
| 2005/0281499 A1 * | 12/2005 | Wojtkowski et al. | 384/473 |
| 2009/0158801 A1 | 6/2009 | Keller | |
| 2011/0278801 A1 * | 11/2011 | Wojtkowski et al. | 277/559 |
| 2011/0299801 A1 * | 12/2011 | Osgood et al. | 384/100 |

FOREIGN PATENT DOCUMENTS

EP    1609542 A1    12/2005

OTHER PUBLICATIONS

PCT International Search Report dated Jun. 22, 2011 corresponding to PCT International Application No. PCT/US2011/031495 filed Apr. 7, 2011 (11 pages).

* cited by examiner

*Primary Examiner* — James Pilkington
*Assistant Examiner* — Adam D Rogers

(57) ABSTRACT

A system is disclosed for use in a rolling mill oil film bearing to remove a laminar flow of oil exiting tangentially from between a rotating sleeve and a fixed bushing surrounding the sleeve. The system comprises confinement surfaces cooperating with the sleeve and the bushing to define an annular chamber arranged to receive the exiting laminar flow of oil. Impellers project into the chamber and are rotatable with and at the velocity of the sleeve to thereby propel the oil around the annular chamber. An outlet communicates tangentially with the annular chamber for removing oil being propelled around the chamber by the rotation of the impellers. The size of the outlet in relation to the volume of oil received in the annular chamber is such that the chamber remains filled with oil during steady state operation of the bearing.

16 Claims, 8 Drawing Sheets

SELF PUMPING OIL FILM BEARING

BACKGROUND OF THE INVENTION

1. Field of the Invention

This invention relates to a system for use in a rolling mill oil film bearing to remove a laminar flow of oil exiting tangentially from between a rotating sleeve and a stationary bushing surrounding the sleeve.

2. Description of the Prior Art

In a typical rolling mill oil film bearing, a sleeve surrounds and is rotatable with a roll neck. The sleeve is journalled for rotation within a fixed bushing contained in a chock. The sleeve and bushing are dimensioned to define a gap therebetween. During operation, oil is introduced continuously into the gap where it is rotatably urged into a hydrodynamically maintained film between the sleeve and bushing at the load zone of the bearing. Laminar flows of oil exit tangentially from each end of the bearing into sumps from which the oil is removed by gravity for filtering and cooling before being recirculated back to the bearings.

A drawback of this arrangement is that large diameter drain lines are required to accommodate the gravity flow of oil exiting from the bearings. These drain lines occupy an inordinate amount of exterior space and thus contribute disadvantageously to the overall size of the bearing. Care must also be taken to insure that the drain lines are properly installed with pitches designed to prevent oil from backing up into and flooding the bearing sumps.

SUMMARY OF THE INVENTION

Broadly stated, the objective of the present invention is to employ the kinetic energy of rotating bearing components to pump oil out of the bearings. Because the oil is forcibly expelled, smaller drain lines may be employed to handle the exiting oil flow, without the need to maintain the drain pitches required to accommodate gravity flow.

These and other features and advantages of the present invention will now be described in further detail with reference to the accompanying drawings, wherein:

DETAILED DESCRIPTION

Figure 1:
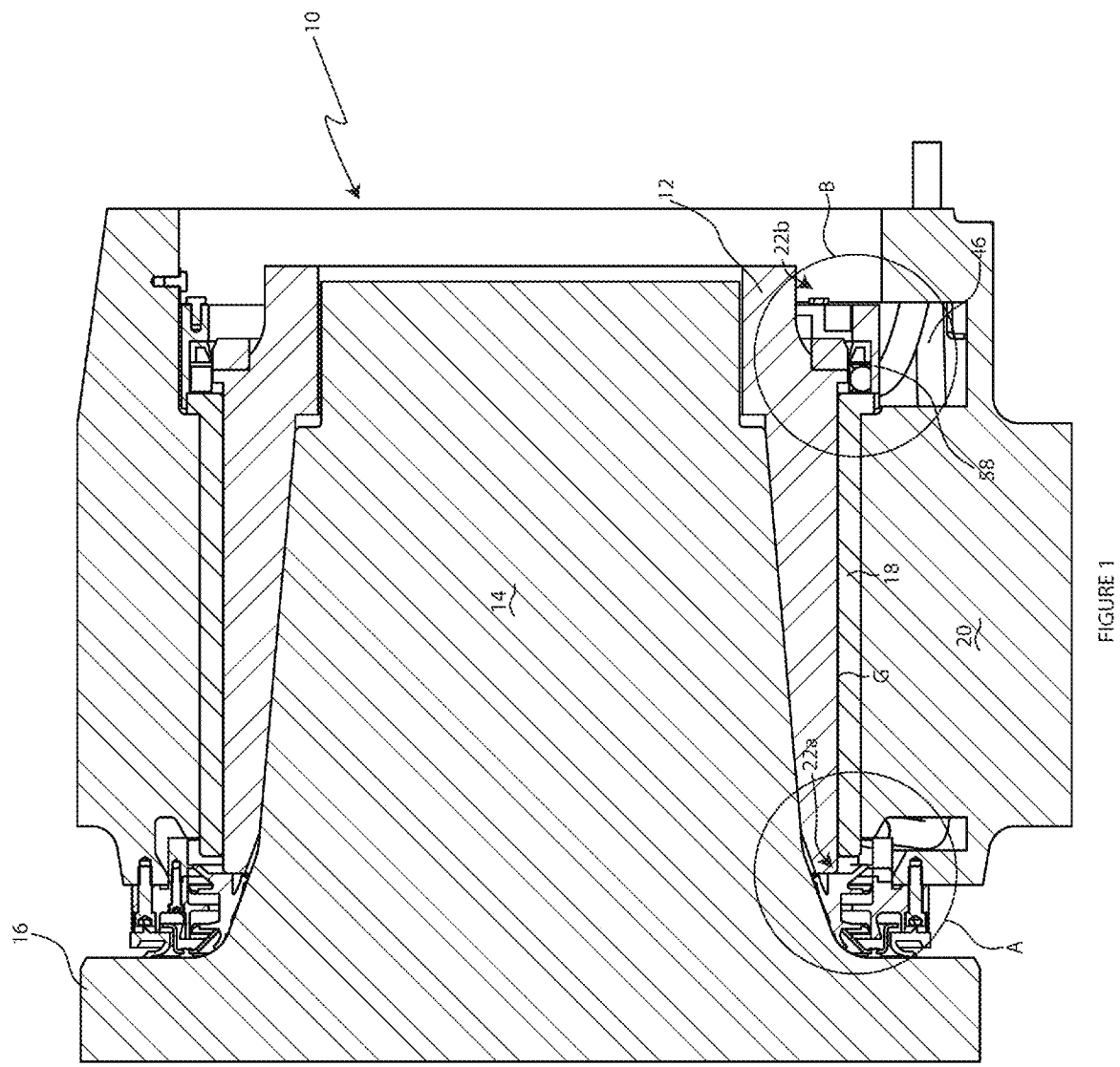
FIG. 1 is a cross sectional view through a rolling mill oil film bearing embodying systems in accordance with the present invention.

With reference initially to FIG. 1, a rolling mill oil film bearing is generally indicated at 10. The bearing includes a sleeve 12 fixed to the tapered neck 14 of a roll 16. The sleeve is journalled for rotation in a fixed bushing 18 contained within a chock 20. The sleeve and bushing are dimensioned to define a gap "G" therebetween. During operation, oil is introduced continuously into the gap where it is rotationally urged by the sleeve into a hydrodynamically maintained film between the sleeve and bushing at the load zone of the bearing. Laminar flows of oil exit tangentially from opposite ends of the bearing.

Figure 2:
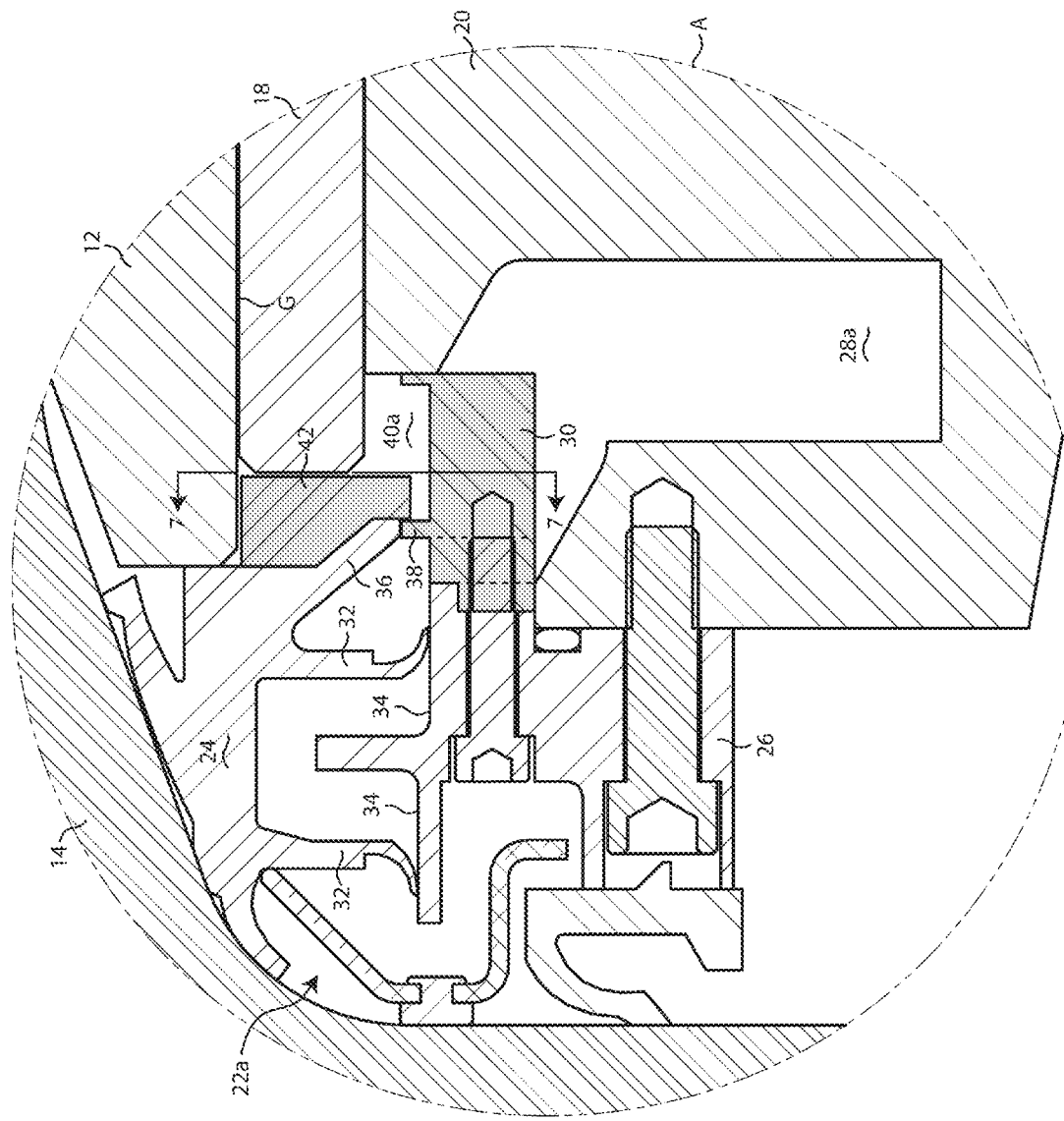
FIG. 2 is an enlarged view of the circled area marked "A" in FIG. 1.

Seal assemblies 22a, 22b are located respectively at the inboard and outboard ends of the bearing. With additional reference to FIG. 2, it will be seen that the inboard seal assembly 22a includes a flexible and resilient neck seal 24 mounted on the tapered roll neck section 14 for rotation therewith along with the sleeve 12. The neck seal is surrounded by a seal end plate 26 fixed to the chock 20.

Figure 6A:
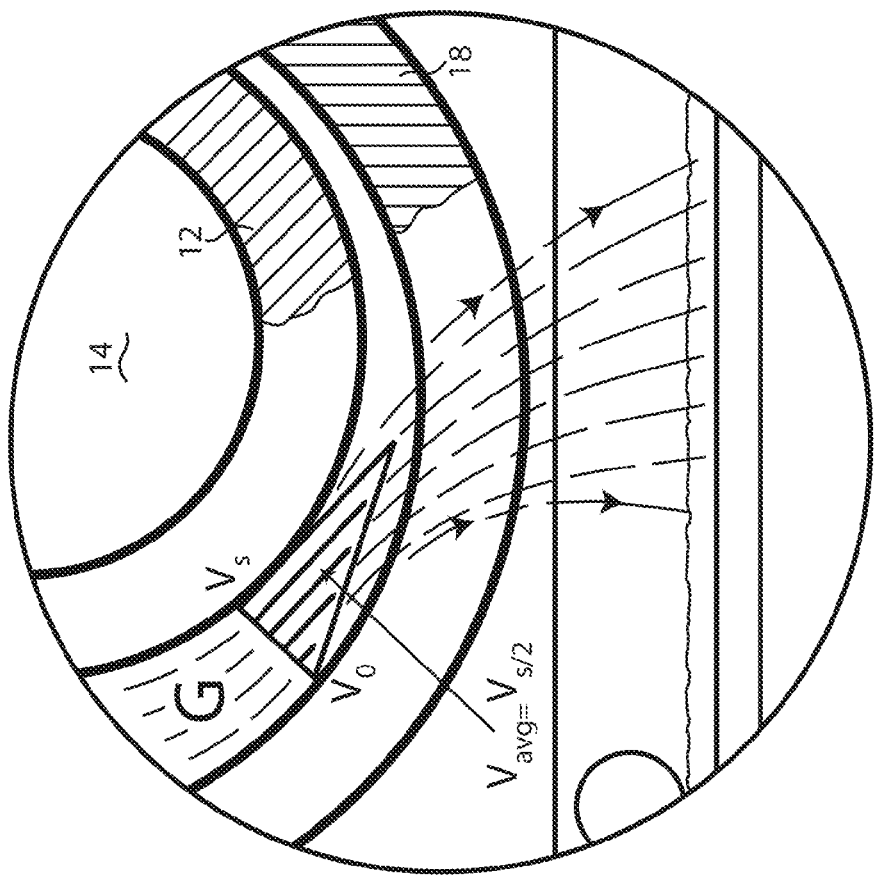
FIG. 6A is an enlarged view of the circled portion shown in FIG. 6 diagrammatically illustrating the velocity profile of the laminar flow of oil exiting from between the sleeve and the bushing.
Figure 6:
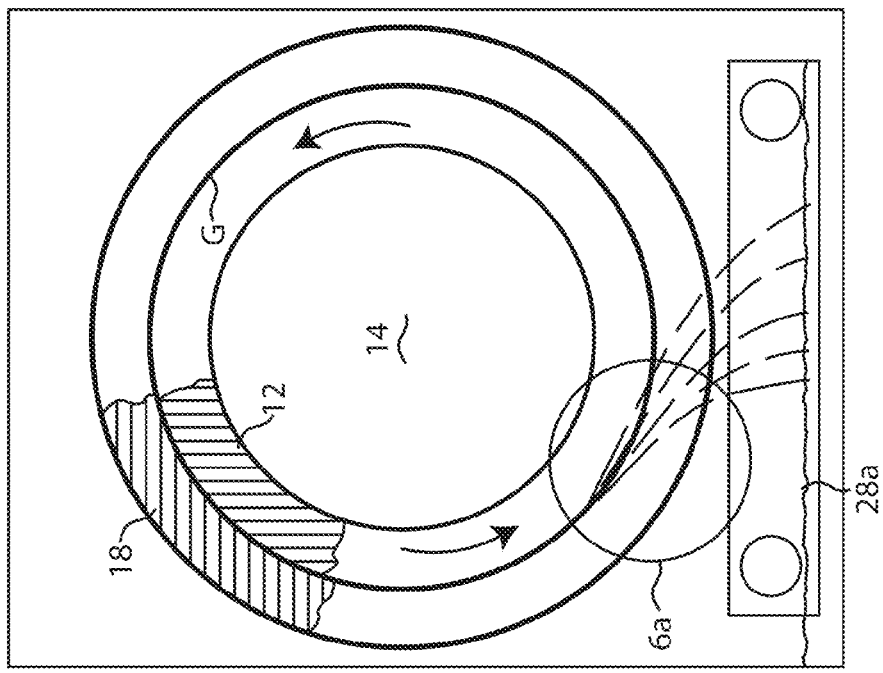
FIG. 6 is a cross sectional view schematically depicting the rotating sleeve surrounded by the fixed bushing.

In conventional bearings, the laminar flow of oil escaping tangentially from between the sleeve and bushing is received in a sump 28a, from which it is drained by gravity. As can be seen from FIGS. 6 and 6A, the oil escaping from gap G has the velocity $V_s$ of the sleeve at the sleeve surface, and a zero velocity V, at the bushing surface. This velocity profile yields an average velocity of V/2.

Figure 3:
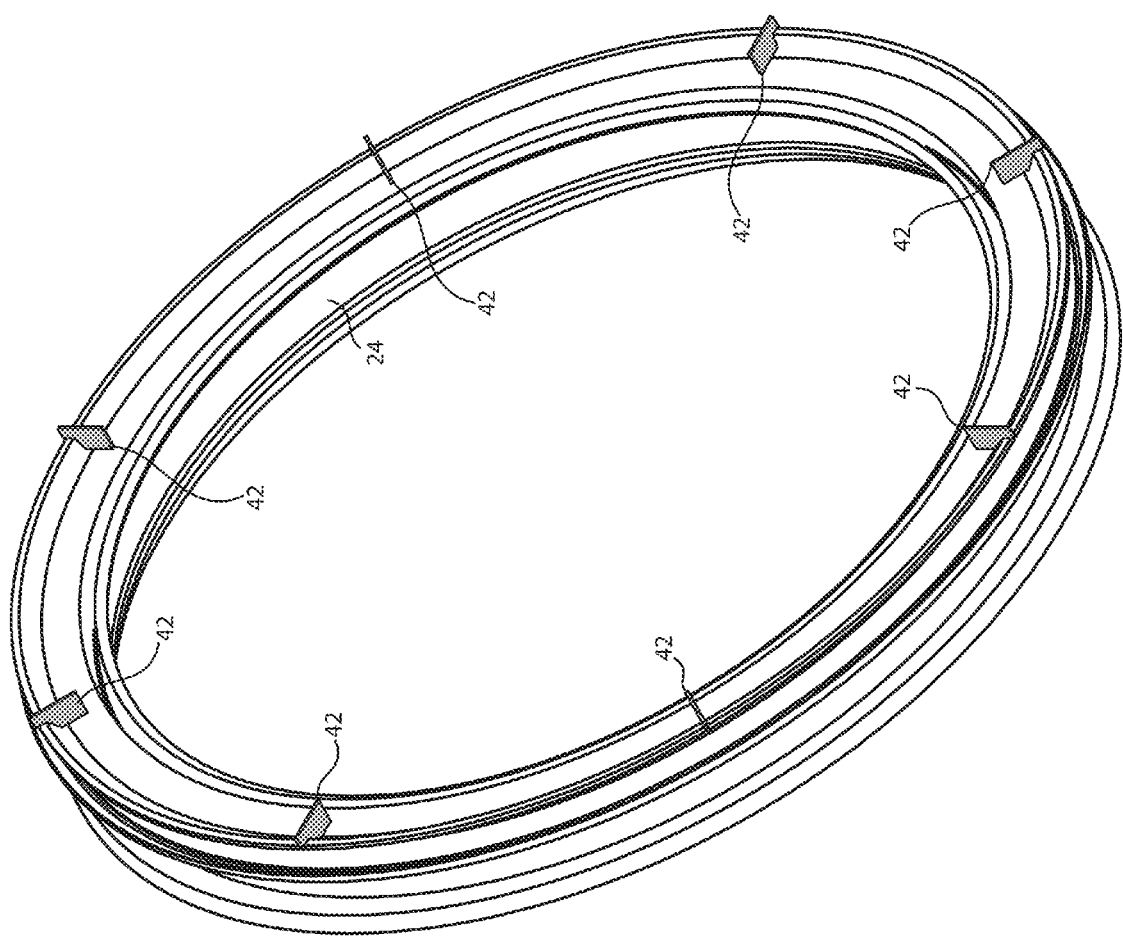
FIG. 3 is a perspective view of the neck seal shown in FIGS. 1 and 2.

With the present invention, however, a circular extension 30 spans a gap between the seal end plate 26 and the chock 20. Flanges 32 on the neck seal sealingly contact shoulders 34 on the seal end plate, and a flinger 36 on the neck seal sealing contacts a circular shoulder 38 on extension 30. Confinement surfaces provided by the flinger 36, extension 30 and chock 20 cooperate with the sleeve 12 and bushing 18 to define an annular inboard chamber 40a isolated from the sump 28a and arranged to receive the laminar flow of oil exiting tangentially from the gap G between the sleeve and bushing. Impellers 42 project into the chamber 40a. As can be best seen by additional reference to FIG. 3, the impellers 42 are carried by and are spaced around the circumference of neck seal 24.

Figure 4:
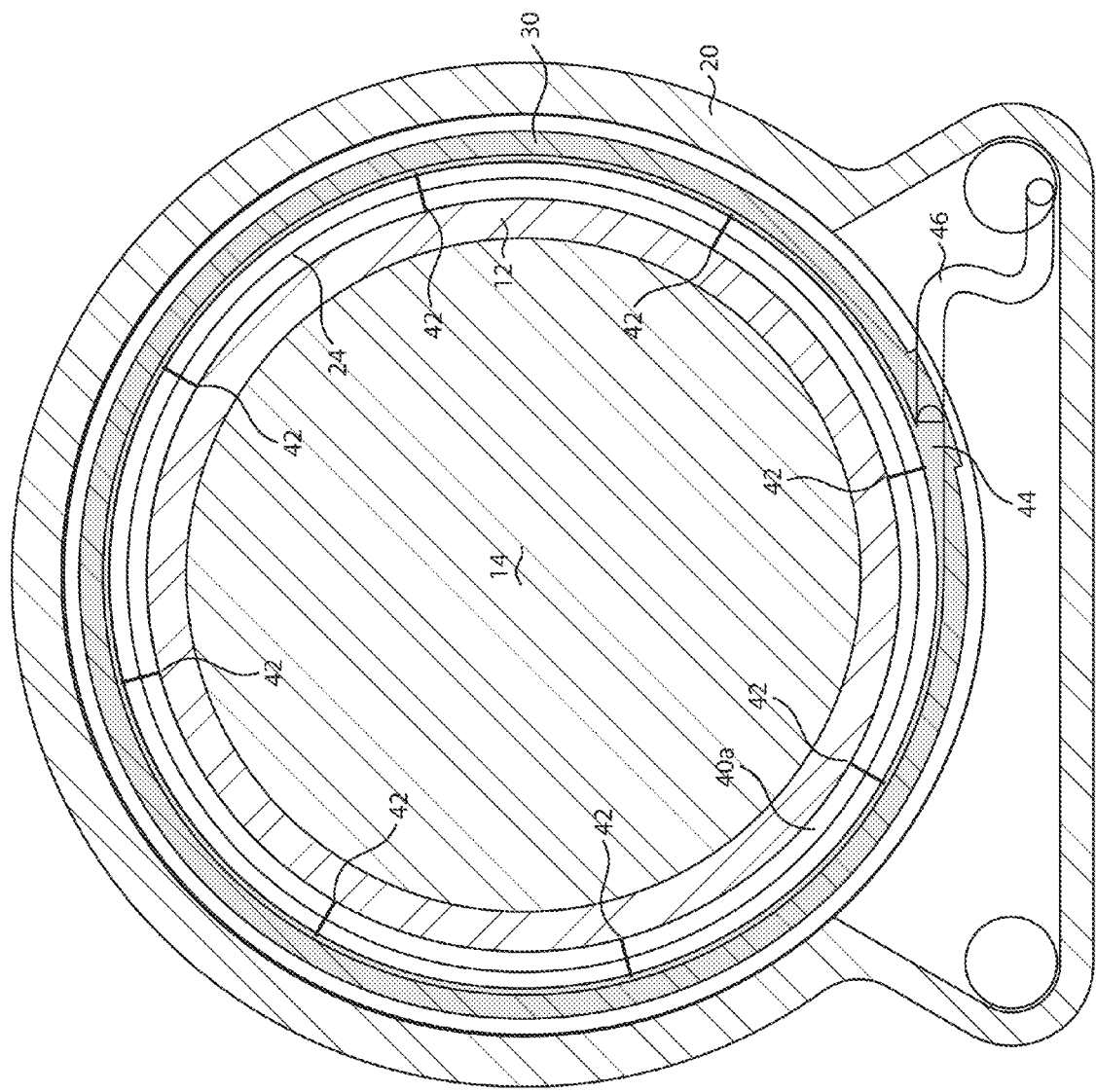
FIG. 4 is a cross sectional view taken through the seal end plate extension.

As shown in FIG. 4, the extension 30 includes an outlet 44 communicating tangentially with the annular chamber 40a. A hose 46 is connected to the outlet 44 and leads to the exterior of the bearing for connection to a conventional mill lubrication system (not shown).

Figure 7:
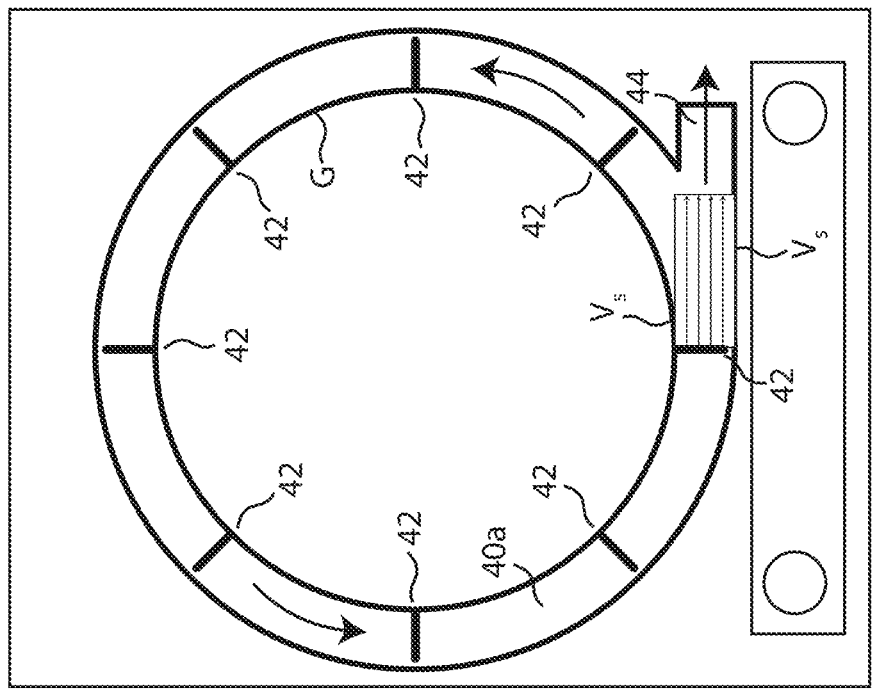
FIG. 7 is a sectional view taken along line 7-7 of FIG. 2 diagrammatically illustrating the velocity profile of the oil being pumped out of the inboard end of the bearing by the rotating impellers of the present invention.

The outlet 44 is sized with respect to the volume of oil being received in the annular chamber 40a such that during steady state operation, that chamber remains filled with oil. As noted previously, both the seal 24 and sleeve 12 are mounted on and rotate with the roll neck 14. Thus, the impellers 42 carried by the seal 24 rotate with and at the velocity of the sleeve. As shown diagrammatically in FIG. 7, in the cross sectional area of the annular chamber 40a spanned by the impellers 42, the velocity of the thus propelled oil is maintained at the velocity $V_s$ of the sleeve. In comparison to the relatively modest level of energy derived from the velocity profile of the conventional arrangement depicted in FIG. 6A, the enhanced velocity profile of the present invention provides a significantly increased level of energy serving to efficiently pump the oil around chamber 40a and out through the outlet 44.

Figure 5:
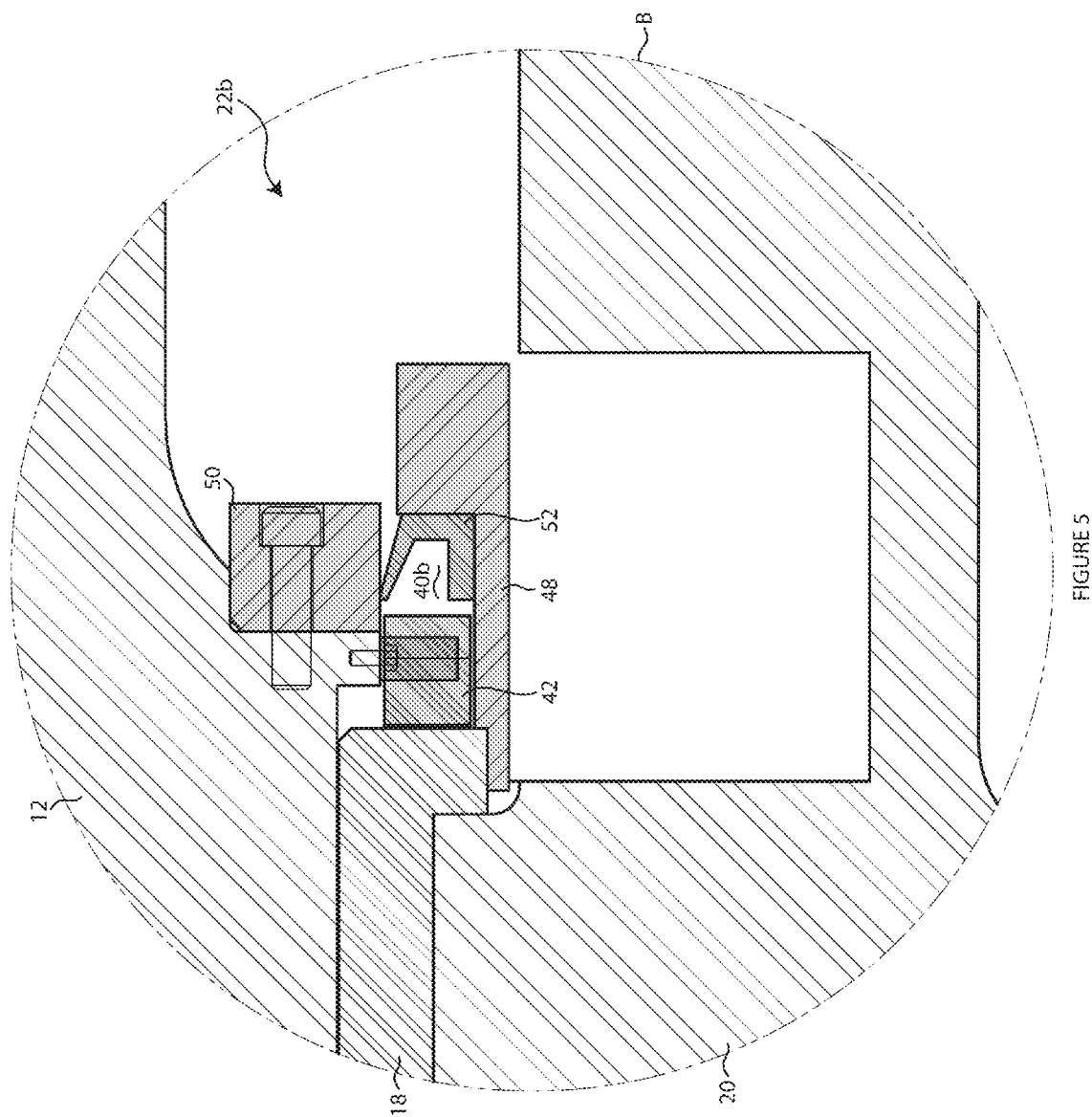
FIG. 5 is an enlarged view of the circled area marked "B" in FIG. 1.

With reference to FIG. 5, it will be seen that a similar arrangement is provided by the seal assembly 22b at the outboard end of the bearing. Here, an annular outboard chamber 40b is defined by confinement surfaces on an extension 48 extending between the bushing 18 and chock 20, a ring 50 secured to the sleeve 12, and a lip seal 52 carried by the extension 48. The impellers 42 are secured to and project radially from the sleeve 12 into the chamber 40b.

Figure 8:
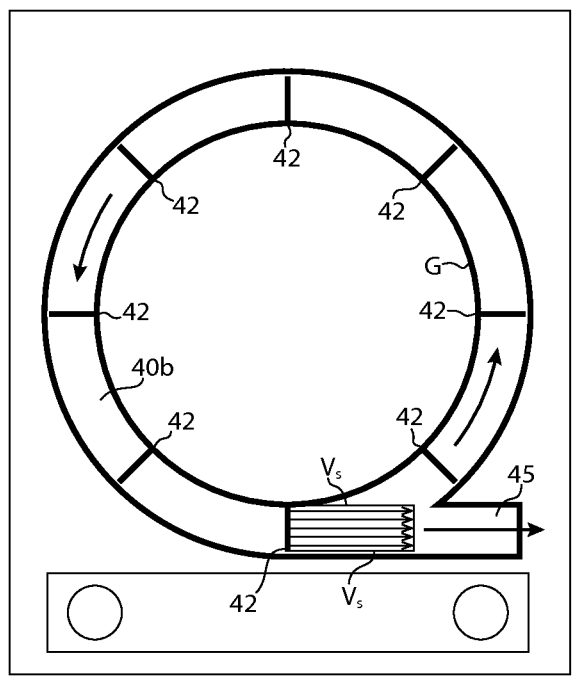
FIG. 8 is a view similar to FIG. 7 diagrammatically illustrating the velocity profile of the oil being pumped out of the outboard end of the bearing by the rotating impellers of the present invention.

As depicted in FIG. 8, an outboard outlet 45 similar to the inboard outlet 44 communicates tangentially with outboard chamber 40b and is connected to a second hose 58 (shown in FIG. 1).

It thus will be seen that the impellers 42 serve to harness the rotating kinetic energy of selected bearing components (for example, the neck seal 24 at the inboard end and the sleeve 18 at the outboard end) to exert a pumping action which forcibly ejects oil from the annular chambers 40a, 40b. As noted above, by forcibly ejecting oil rather than relying on gravity flow, smaller diameter drain lines may be employed and strategically positioned without regard to the maintenance of gravity pitches.

We claim:

1. A system for use in a rolling mill oil film bearing to remove a laminar flow of oil exiting tangentially from between a rotating sleeve and a fixed bushing surrounding the sleeve, said system comprising:
   confinement surfaces defining an annular chamber arranged to receive said laminar flow of oil;
   impellers projecting into said chamber, said impellers being rotatable with and at the velocity of said sleeve to thereby propel said oil around said chamber; and
   an outlet communicating tangentially with said chamber for removing said oil being propelled around said chamber by the rotation of said impellers, the size of said outlet in relation to the volume of oil received in said chamber being such that said chamber remains filled with oil during rotation of said impellers.

2. The system of claim 1 wherein said sleeve is mounted on a roll neck and wherein said confinement surfaces are defined in part by a resilient seal also mounted on the roll neck for rotation therewith.

3. The system of claim 2 wherein said bushing is fixed within a chock, and said confinement surfaces are defined in part by a seal end plate surrounding said seal and fixed to said chock.

4. The system as claimed in claim 3 wherein said confinement surfaces are defined in part by a circular extension spanning a gap between said seal end plate and said chock.

5. The system of claim 4 wherein said outlet is formed in said circular extension.

6. The system of claim 5 wherein said impellers are carried on said seal for rotation therewith.

7. The system of claim 4 wherein said impellers are carried on said seal for rotation therewith.

8. The system of claim 1 wherein said confinement surfaces are defined in part by a circular seal ring secured to said sleeve for rotation therewith.

9. The system of claim 8 wherein said impellers are carried on said sleeve for rotation therewith.

10. The system of claim 8 wherein said confinement surfaces are defined in part by a circular extension fixed to said bushing, said circular extension being spaced radially from said seal ring to define a gap therebetween.

11. The system of claim 10 wherein said confinement surfaces are defined in part by a flexible seal spanning said gap and fixed to said circular extension.

12. The system of claim 11 wherein said impellers are carried on said sleeve for rotation therewith.

13. The system of claim 10 wherein said outlet is formed in said circular extension.

14. The system of claim 10 wherein said impellers are carried on said sleeve for rotation therewith.

15. A system for use in a rolling mill oil film bearing in which oil is introduced between a rotating sleeve and a fixed bushing surrounding the sleeve, and in which the oil exits tangentially from an inboard end and an outboard end of said bearing in the form of laminar flows, said system comprising:
   confinement surfaces cooperating with said sleeve and said bushing to define an annular inboard chamber and an annular outboard chamber arranged respectively to receive the tangentially exiting laminar flows of oil from the inboard end and the outboard end of said bearing;
   impellers projecting into said chambers, said impellers being rotatable with and at the speed of said sleeve to thereby propel said oil received in said chambers around said chambers; and
   an inboard outlet and an outboard outlet respectively communicating tangentially with said inboard chamber and said outboard chamber for removing said oil being propelled around said chambers by the rotation of said impellers, the size of said outlets in relation to the volume of oil received in said chambers being such that said chambers remain filled with oil during rotation of said impellers.

16. In a rolling mill oil film bearing, a method of removing a laminar flow of oil exiting tangentially from between a rotating sleeve and a fixed bushing surrounding the rotating sleeve, said method comprising:
   receiving the laminar flow of oil in an annular chamber;
   rotatively propelling the oil around said chamber at the velocity of said rotating sleeve; and
   removing the rotatively propelled oil tangentially from said chamber at a rate such that said chamber remains filled with oil.

\* \* \* \* \*